Patented July 27, 1954

2,684,904

UNITED STATES PATENT OFFICE 2,684,904

MALT FLOUR PRODUCT

Roland W. Selman, Leawood, Kans., and Larry F. Marnett, Kansas City, Mo., assignors to C. J. Patterson Company, a corporation of Missouri No Drawing. Application December 11, 1950, Serial No. 200,302

6 Claims. (Cl. 99—27)

This invention relates to malt flour. In particular the invention is directed to a malt flour product composed of malt flour and salt, and with or without a filler.

Malt flour, as used in this invention, is prepared by tempering cereal grains, usually barley or wheat, in water and allowing the same to sprout. This grain is dried and milled into flour. The malt flour thus prepared is to be distinguished from a malt syrup composed of a highly hygroscopic powder obtained by mashing the sprouted grains, extracting with water, and then dehydrating the extract.

The objects of this invention are to produce a malt flour product for use in bakeries, which is dry and freely flowable, is of uniform diastatic strength, has great stability in storage, high weevil resistance, and low proteolytic activity. A further object is to produce a malt product which stays very dry under normal bakery atmospheric conditions, and which has a controlled alpha-amylase strength.

In the making of yeast leavened baked products, the enzymatic activity of the yeast converts the starch in the flour into sugar, from which alcohol and carbon dioxide are evolved. Yeast activity is maintained by the sugar and other yeast foods. While still in dough form, the gluten serves as the elastic medium by reason of which the dough can be shaped and evolved gases contained. During baking, at about a temperature of 140° F., denaturation of the gluten begins, while the starch starts to gel, then stiffens to form the final cellular skeleton of the baked product.

When dough is made with ordinary non-diastated bakers patent flour or straight grade flours, it sometimes happens that the conversion of starch into sugar does not proceed with sufficient rapidity to feed the yeast, and the resulting product is poorly leavened. Malt flour, however, contains considerable amounts of the two starch-hydrolyzing enzymes, namely, alpha-amylase and beta-amylase. In particular, alpha-amylase is often lacking in patent or straight flours. Malt flour, consequently, is added to patent or straight grade flours of low diastatic activity in order to obtain a baked product of good structural quality, as well as of improved aroma and flavor. The alpha-amylase enzyme is believed to be primarily responsible for the viscosity of the starch gel which should be sufficiently pliable to permit the dough to expand during baking, but sufficiently stiff to establish the final structural shape of the baked product.

Certain difficulties have been encountered heretofore in the use of malt flour as an additive to patent or straight grade flours. First of all, both malt flour, and patent and straight grade flours vary widely in malt strength even in the same type of flour, due to seasonal growing variations, methods of milling and blending, and other factors. It has been, in the past, customary to determine malt strength of flour by measuring the Lintner strength. This is a value used in the brewing industry as a guide to the amount of alcohol which may be produced from a given quantity of starch and is dependent predominately upon a measure of the beta-amylase activity to measure the amount of maltose produced from the starch. However, in baking the amount of maltose produced is of little interest, the important thing being the conditioning of the starch by reason of the action of the alpha-amylase in converting the starch into dextrins. Consequently, no one has heretofore furnished the baking industry with a malted flour of controlled alpha-amylase strength.

Secondly, the malt strength of the flour deteriorates during periods of storage. Thus, even though the Lintner strength of the malt flour was known at some time, such strength was an unknown lesser value at the time the flour was used. Thirdly, malt flour is highly susceptible to infestation by insects, chiefly by the weevil "Tribolium Confusum." The loss of contaminated malt flour from infestation has been so great as to discourage the use of malt flour.

The above difficulties are successfully overcome by the instant invention.

An unmalted patent or straight grade flour is first selected, such flour having an amylograph strength above 1000 B. U. (Brabender Units) as determined by the Selman and Summer method, Cereal Chemistry, vol. XXIV, No. 4, July 1947, pages 291 to 299, inclusive. An amount of malt flour and salt is diluted with unmalted clear grade flour until when 0.4% of the malt flour, clear grade flour and salt mix, by weight of the selected flour, is added to the selected flour, an amylograph reading of 500 B. U. is obtained. The amount of clear flour used will range from zero to 50%, depending upon the strength of the malt flour. The amount of salt originally incorporated with the malt flour is in such quantity as to be at least 10% of the final malt flour, salt and clear flour mixture. Sodium chloride is a satisfactory salt in that it particularly meets with pure food standards. Commercial grades of finely ground salt, such as flake salt, or flour salt, are not suitable, as only about 10% of these salts will pass through a 325 mesh sieve, the bulk of the particles being too large to be effective in achieving the enzymic stability, moisture and weevil controls of this new malt flour product.

To prepare flour for baking, the patent and straight grade flours first are tested in the Brabender amylograph for malt strength. The amylograph is graduated to read from zero to 1000 B. U. Readings above 500 B. U. indicate insufficiently low malt strength, and a baked product made from such flour would have poor structural characteristics due to the lack of starch gel conditioning by the alpha-amylase. Thus, if a patent or straight grade flour has a reading above 500 B. U. on the amylograph, sufficient of the new malt flour product is added to the patent or straight grade flour so that the adjusted flour will then give an amylograph reading of approximately 500 B. U. Baked products obtained from the thus prepared flour are of excellent taste, texture and aroma, and the standard of quality can be maintained through successive batches of flour.

Ordinary salt, NaCl is well known as a preservative, and its use as an insecticide has been suggested for protecting cereals in grain form, the salt being applied as brine, or in crystal form of a particle size too large to pass a 200 mesh sieve. Inert materials having a maximum particle size of 10 microns have been used as insecticides. However, the particle size of any material by itself is not the sole controlling factor as it has been found that weevils will thrive in an unsalted malt flour, the flour particles being not greater than about 44 microns, whereas the insects will die when salt of the same particle range is added to this malt flour.

In the preparation of the salt for the malt flour and salt product of this invention, the salt is ground so that the particles will pass a 325 mesh sieve, the particles thus having a size of approximately 44 microns or less, the majority of the particles by weight being greater than 10 microns. The sieve used has sieve openings of 44 microns, equal to 0.0017 inch or 0.001 mm. and as exists in U. S. Standard Sieve No. 325. About 5% magnesium carbonate, by weight, may be ground with the salt to improve the free flowing thereof. When 10% by weight of this fine salt is added to raw malt flour, weevil growth and reproductivity is substantially inhibited, and when from 20% to 50% by weight of salt to malt flour is mixed, weevil life is destroyed, as illustrated in the following example:

Sodium chloride passing a 325 mesh sieve was added in varying amounts to raw malt flour both together, with and without clear grade flour as set forth in the table, and adult weevils introduced, respectively, into each sample. The samples were allowed to stand under room conditions for from 27 to 60 days. They were then dumped into a 40 mesh sieve, and the infestation sorted and counted.

*Table I*

| Sample Composition | Weevils Introduced | Adults Alive | Dead | Pupae + Larvae | Total | Time |
|---|---|---|---|---|---|---|
| 40% Malt, 60% Flour, No Salt. | 10 | 11 | 0 | 176 | 187 | 42 days. |
| 40% Malt, 50% Flour, 10% Salt. | 10 | 0 | 10 | ¹2 | 12 | Do. |
| 40% Malt, 40% Flour, 20% Salt. | 10 | 0 | 9 | 0 | ²9 | Do. |
| 40% Malt, 30% Flour, 30% Salt. | 10 | 0 | 5 | 0 | ²5 | Do. |
| 40% Malt, 10% Flour, 50% Salt. | 10 | 0 | 10 | 0 | 10 | Do. |
| 40% Malt, 60% Flour, No Salt. | 20 | 20 | 0 | 20 | 40 | 27 days. |
| 40% Malt, 40% Flour, 20% Salt. | 20 | 0 | 19 | 0 | ²19 | Do. |
| 40% Malt, 20% Flour, 40% Salt. | 20 | 0 | 3 | 0 | ²3 | Do. |
| Control (Malt, No Additive). | 10 | 52 | 2 | 124 | 178 | 60 days. |
| 50% Malt plus 50% Salt | 10 | 0 | 10 | 0 | 10 | Do. |
| 75% Malt plus 25% Salt | 10 | 0 | 10 | 0 | 10 | Do. |

¹ Very small.
² Apparently some of the insects with which these samples were inoculated were able to escape the containers through the perforations in the lids since the original number were not at all present at the final counting.

The table shows that weevil activity is greatly curtailed when 10% of salt is used, and that weevil life ceases when 20% and above of salt is added to the malt flour.

Bread doughs were prepared composed of straight and patent grade flour with the salted malted product added in the percentages according to the following table so that each dough had an amylograph index strength of 500.

*Table II*

| Amylograph Malt Index of Patent or Straight Grade Flour | Percent by Weight of Flour of Salted Malt Product Added to Patent or Straight Flour |
|---|---|
| 1,000 B. U. | 0.4 |
| 950 B. U. | 0.36 |
| 900 B. U. | 0.32 |
| 850 B. U. | 0.29 |
| 800 B. U. | 0.26 |
| 750 B. U. | 0.22 |
| 700 B. U. | 0.19 |
| 650 B. U. | 0.16 |
| 600 B. U. | 0.13 |
| 550 B. U. | 0.10 |
| 500 B. U. | 0.00 |

Otherwise the doughs contained the usual ingredients and were baked according to standard practices. Products made from these doughs were of excellent quality.

The characteristic of alpha-amylase stability of the salt malt flour product has been observed in the commercial use of the product for more than six months time. Whereas malt flour is known to lose some of its alpha-amylase strength when stored for several months, repeated sampling of the new salt malt flour product shows that the alpha-amylase strength drops very little, and less than that lost by malt flour, over a similar period of time. This improved stability is attributed to the finely ground salt in the new salt malt product.

While the reason is not understood thoroughly, it is believed due at least in part to the very dry product obtained by mixing the fine salt with the malt flour. However, it is certain that stability is obtained when the salted malt product has a moisture content of less than 10%. This is contrary to the inhibition of the proteolytic activity which apparently does not begin until the salt goes into aqueous solution when the dough is made.

The finely ground salt and malt flour product has other advantageous characteristics. The mixture does not hard cake and thus is handled easily. This is probably due to the fact that sodium chloride ground to pass a 325 mesh sieve is only slightly hygroscopic. This makes the product dry and freely flowable. It is hygroscopic enough to lower the malt flour moisture content below the level at which insect life tends to survive. For example, in flours, insect life thrives at a moisture level of about 12%, and their metamorphic processes are retarded at levels less than about 10%. A mixture of 40% by weight of finely ground salt with flour will lower the moisture content of the mix to about from 5% to 6%, this being below the optimum for insect survival. It is not known that the low moisture content is the sole reason for the prevention of insect life in the flour as there is evidence indicating that the insects may eat lethal quantities of the salt, and also that the salt adhering to the insects absorbs vital fluids from their bodies. It is quite likely that a combination of factors are involved.

A further characteristic lies in the low proteolytic activity of the salt and malt flour mixture. A malt flour having a high content of proteolytic enzymes will digest too much of the protein gluten, and the dough will lack sufficient gluten to form the elastic membrane to confine the carbon dioxide so that the dough can rise. Although the alpha-amylase activity is not materially affected by the salt, the proteolytic enzymes are inhibited by the pressure of the salt against over activity.

*Table III*

| Sample | Proteolytic Activity in mg. Nitrogen Per 100 g. Enzyme Material |
|---|---|
| Barley Malt Flour | 110.2 |
| Wheat Malt Flour | 46.5 |
| Malt Flour, Salt and Clear Grade Flour | 27.7 |

As shown by the value 27.7, the use of the salt and malt product will have much less proteolytic activity in bread doughs.

Having now described the means by which the objects of the invention are obtained, we claim:

1. A diastatic active malt and flour product comprising a mixture of malt flour with from 10 to 50% by weight sodium chloride, and said salt having a particle size passing through a 325 mesh sieve.

2. A product as in claim 1 further including up to 50% of clear grade flour.

3. A malt and flour product of high and stable diastatic activity comprising malt flour mixed with sodium chloride having particle sizes not greater than those passing a 325 mesh sieve, and a clear grade flour, said clear grade flour being in an amount such that when 0.4% of the admixture is added to an unsalted patent or straight grade flour an amylograph value of about 500 B. U. exists, and said salt being in the proportion of from 10 to 50% by weight, in the admixture.

4. A product as in claim 3, said clear grade flour ranging from zero to 50% by weight, of said admixture.

5. A product as in claim 1, said product having a moisture content ranging between 2 and 10%.

6. A diastatic active malt flour and salt product comprising malt flour and from 10 to 50% by weight anhydrous salt, said product having a moisture content of less than 10%, and said salt having a particle size passing through a 325 mesh sieve.

References Cited in the file of this patent

UNITED STATES PATENTS

| Number | Name | Date |
|---|---|---|
| 60,370 | Hawks | Dec. 11, 1866 |
| 427,779 | Manwaring | May 3, 1880 |
| 1,100,176 | Elger | June 16, 1914 |
| 1,493,685 | Lindsey | May 13, 1924 |
| 2,197,784 | Bauer | Apr. 23, 1940 |
| 2,275,836 | Briess | Mar. 10, 1942 |
| 2,434,204 | Feachem | Jan. 6, 1948 |

FOREIGN PATENTS

| Number | Country | Date |
|---|---|---|
| 4,195 | Great Britain | 1895 |
| 104,438 | Great Britain | Mar. 8, 1917 |

OTHER REFERENCES

Kitchener et al., Chemistry and Industry, January 23, 1943, pp. 32–3.